Dec. 16, 1969  S. C. JORDAN ET AL  3,484,858
SELF-CLEANING OVEN WITH OVER-TEMPERATURE PROTECTIVE SYSTEMS
Filed Nov. 24, 1967  2 Sheets-Sheet 1
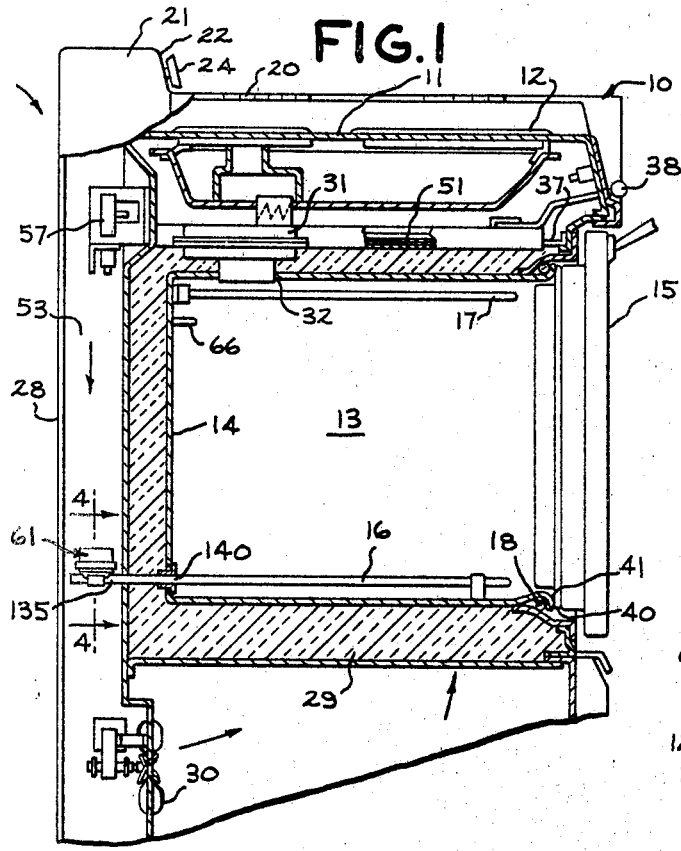
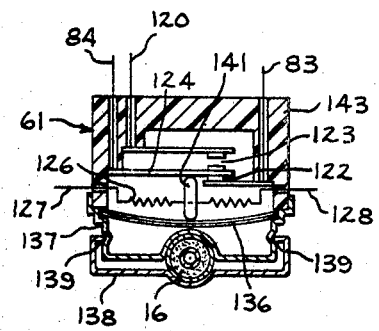
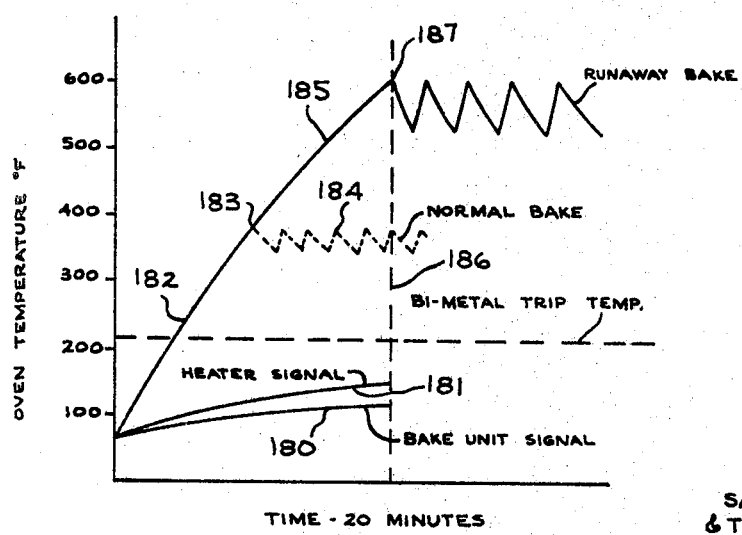
INVENTORS
SAMUEL C. JORDAN
& TEAMUS BOWLING
BY Richard L. Caslin
THEIR ATTORNEY Dec. 16, 1969   S. C. JORDAN ET AL   3,484,858
SELF-CLEANING OVEN WITH OVER-TEMPERATURE PROTECTIVE SYSTEMS
Filed Nov. 24, 1967   2 Sheets-Sheet 2

FIG.2

INVENTORS
SAMUEL C. JORDAN
& TEAMUS BOWLING
BY *Richard L. Caslin*
THEIR ATTORNEY United States Patent Office 3,484,858
Patented Dec. 16, 1969

3,484,858
**SELF-CLEANING OVEN WITH OVER-TEM-
PERATURE PROTECTIVE SYSTEMS**
Samuel C. Jordan, Louisville, and Teamus Bowling, Fern
Creek, Ky., assignors to General Electric Company,
a corporation of New York
Filed Nov. 24, 1967, Ser. No. 692,253
Int. Cl. F27d *11/00;* A21b *1/00, 1/22*
U.S. Cl. 219—413                                         9 Claims

ABSTRACT OF THE DISCLOSURE

A self-cleaning oven having an oven cavity formed by a box-like oven liner and a front-opening access door. The oven has several metal-sheathed, electrical resistance heating elements that are adapted to be connected to a three-wire source of alternating current. There is a manual door latching mechanism for locking the door during a high temperature, heat-cleaning cycle that has a maximum internal oven wall temperature above about 750° F. There is also an automatic locking means for the door latching mechanism, and an electro-responsive release means cooperating with the said locking means. The improvement relates to a temperature limiting, thermal switch connected in the oven circuits to be in series with the oven heating elements during the cooking cycle, while the same thermal switch is joined in a series connection with the electroresponsive release means during the heat-cleaning cycle. The thermal switch is set to trip when the oven air temperature reaches about 600° F. so that the thermal switch serves as a backup temperature protective system for the usual oven temperature control means in the cooking mode, while serving as a means to disable the electroresponsive means during the heat-cleaning mode when the oven air temperature rises above about 600° F. to prevent gaining entrance to the oven cavity.

CROSS-REFERENCE TO RELATED APPLICATION

The present invention is a modification of the thermal, door interlock system in conjunction with the door latching mechanism of a self-cleaning oven as described in the patent of Clarence Getman, No. 3,350,542 which is a continuation-in-part of original application Ser. No. 323,809 which was filed in the U.S. Patent Office on Nov. 14, 1963, and is now abandoned.

BACKGROUND OF THE INVENTION

The present invention relates to a temperature limiting, thermal switch means having a dual function of first serving as a backup temperature control means for the oven thermostatic control during normal baking operations to prevent a runaway temperature condition in the event of a control failure, and second as an over-temperature, door interlock device in combination with a door latching mechanism to insure that the oven cavity may not be entered when the oven air temperature rises above about 600° F.

This invention is related to the art of self-cleaning ovens which utilize a pyrolytic method of cleaning the walls of the oven of food soil by raising the temperature of the walls into a heat-cleaning temperature range above about 750° F. At this high temperature, the food soils are transformed into gaseous degradation products which are then oxidized and finally discharged from the oven cavity. The details of this method and of a preferred embodiment of an oven design in which it may be carried out are fully disclosed in the patent of Bohdan Hurko No. 3,121,158, which is also assigned to the General Electric Company, the assignee of the present invention.

Once the method of pyrolysis was perfected and adopted for the automatic heat-cleaning of baking ovens, many different systems of applying the heat, governing heat transfer and controlling the cleaning cycle were devised to obtain the desired results. To obtain the maximum reliability, standard components were used where possible to take advantage of the years of engineering development and know-how gained by working with the components, and they were arranged in fail-safe combinations so that after years of trouble-free usage of the oven any failure of a component would not constitute a safety hazard. Instead, the failure of these components would render inoperative the heating circuit or function in which the component operates.

The present invention is concerned with the dual function of insuring that during a baking operation the oven air temperature does not rise above about 600° F. in the event of a failure of one of the control elements, and secondly to insure that the housewife may not unlatch the oven door during a heat-cleaning operation unless the oven air temperature returns below about 600° F.

The principal object of the present invention is to provide a self-cleaning oven with a dual function, temperature limiting, thermal switch means which operates in conjunction with the oven heating means to backup the normal oven thermostatic control system to prevent an over-temperature condition in the event of a control failure in the primary oven thermostat system.

A still further object of the present invention is to provide an oven-temperature control system utilizing a dual function, thermal switch mechanism that is located remotely from the heat of the oven cavity so as to be exposed to a relatively low, stable temperature that is an analog of the oven air temperature.

SUMMARY OF THE INVENTION

The present invention, in accordance with one form thereof, relates to a self-cleaning baking oven that has a high temperature heat-cleaning mode with a maximum temperature above about 750° F. for removing the food soil that has been deposited on the walls forming the oven cavity. The oven is provided with a door latching mechanism for holding the oven door closed during the heat-cleaning cycle. A locking means is combined with the door latching mechanism and there is an electroresponsive release means cooperating with the locking means. The invention comprises a fixed point, temperature limiting, thermal switch which during the cooking mode is connected in series with the oven heating means so as to de-energize the oven heating means if the oven temperature rises above a preset critical temperature of the thermal switch. This thermal switch during a heat-cleaning mode is rearranged into a circuit for the electroresponsive means for opening the circuit whenever the oven temperature reaches a preset critical temperature of about 600° F. so as to prevent entrance into the oven cavity whenever the oven temperautre is above about 600° F.

BRIEF DESCRIPTION OF THE DRAWING

Our invention will be better understood from the following description taken in conjunction with the accompanying drawings and its scope will be pointed out in the appended claims.

FIGURE 1 is a left side elevational view of a free-standing electric range embodying the present invention with some parts broken away and others in cross-section to best show the oven construction.

FIGURE 2 is a schematic diagram of the power and control circuits for an electric oven embodying the present invention.

FIGURE 3 is a graphic illustration of the temperature-time relationship involved during normal baking operations and a runaway temperature condition during a baking operation where a temperature limiting, thermal switch serves as a backup device for the usual oven thermostatic control system.

FIGURE 4 is a cross-sectional elevational view on an enlarged scale taken through the thermal switch on the line 4—4 of FIGURE 1 showing the thermal switch mounted directly on the unheated terminal end of the lower baking element to be at a remote location from the oven cavity.

DESCRIPTION OF THE PREFERRED EMBODIMENT

Turning now to a consideration of the drawings, and in particular to FIGURE 1, there is shown for illustrative purposes a free-standing electric range 10 having a top cooking surface or a cooktop 11 containing a plurality of surface heating elements 12, and an oven cavity 13 formed by a box-like oven liner 14 and a front-opening access door 15. The oven cavity 13 is supplied with two standard, metal sheathed, electrical resistance, oven heating elements; namely, a lower baking element 16 and an upper broiling element 17. A third heating element has been added adjacent the periphery of the oven door 15 to replenish the heat lost in this area around the door and thereby obtaining generally uniform oven wall temperatures during the heat-cleaning cycle. This third heater is identified as a mullion or perimeter heater 18 that is wrapped around the outside of the oven liner; for example, in a manner that is taught by the James K. Newell Patent No. 3,017,488, which is also assigned to the General Electric Company, the assignee of the present invention.

The control of the surface heating elements 12 is obtained by selector switches 20 which are illustrated as multiple pushbutton switches arranged in pairs along the opposite side arms of the cooktop 11 so as to be oriented with the particular surface heating element that is to be controlled thereby. In addition, the range is provided with a backsplash 21 that is vertically arranged along the back edge of the cooktop 11 and provided with an instrument or control panel 22. This control panel will contain most of the remaining control components of the range such as an oven selector switch and an oven thermostat or temperature responder, such as elements 24 and 25 respectively in FIGURE 2, an oven clock-timer and possibly indicator lights or pilot lights to show when any one of the heating elements are energized.

The main element of the range is an outer sheet metal body or cabinet 28 which has an appearance finish of porcelain enamel or the like, and which serves as the superstructure that supports and encloses the cooktop and oven. Sandwiched between the oven liner 14 and the range body or cabinet 28 is an extra thick blanket of thermal insulating material 29 such as fiber glass or the like. The oven door 15 is also specially insulated to cut down on the heat transfer through the door. The amount of insulation being used has been increased over the amount of insulation of standard ovens because of the high operating temperatures encountered during the heat-cleaning operation which may reach a maximum oven air temperature somewhere above about 750° F. A cooling fan 30 is located within the range body to circulate room air around the insulated oven liner and hold down the temperatures of the outer walls of the range.

During the heat-cleaning operation water vapor, free carbon, soot, carbon monoxide gases and other products of combustion are formed and these are degraded before the oven exhaust is returned to the kitchen atmosphere. A catalytic smoke eliminator 31 is positioned in an oven vent opening 32 to serve as a combined oxidation unit and exhaust means for the oven. This catalytic smoke eliminator may be of the type that is taught in the Welch Patent No. 2,900,483, which is also assigned to the General Electric Company, the assignee of the present invention. Such a smoke, odor and vapor eliminating device includes a heating means in cooperation with a catalytic platinum surface such as a wire screen that is heated to a temperature of about 1300° F. and serves to consume the smoke, odors, and vapors emanating from the oven cavity before these treated gases are expelled into the kitchen.

It has been found necessary to provide a latching and interlocking means for the oven door 15 to insure that the oven door is first closed before being able to start the heat-cleaning cycle and then the door cannot be opened while the oven is being operated in the high temperature portion of a heat-cleaning cycle. A suitable door latching mechanism is identified roughly as element 37 in FIGURE 1, although it is best described in the before-mentioned Barber Patent 3,313,918. Accordingly only brief mention will be made here of this door latching mechanism, as the specific nature of the mechanism does not form a part of the present invention. The door latching mechanism includes a manually operable handle lever 38 which extends through an elongated slot (not shown) in the front edge of the cooktop 11 in a position just above and parallel to the top edge of the oven door 15. Such a door latching mechanism would include a pivotally mounted bolt member (not shown) which is adapted to move in response to movement of the door latch handle 38 to engage a keeper (not shown) on the inner face of the oven door 15 and pull the door closed against a resilient door seal or gasket 40 which is carried by the door and is positioned to bear against the front lip or flange 41 of the oven liner 14. Such a door latching mechanism which pulls in the oven door tight against the door gasket so as to accurately meter the amount of air that is allowed to enter the oven cavity around the door gasket or between the two separated ends of the gasket for purposes of promoting oxidation in the oven cavity 13 as well as in the catalytic oxidation unit 31.

The door latching mechanism 37 includes an automatic locking means in the form of a pivoted lever 44 shown diagrammatically in the circuit diagram of FIGURE 2, for locking the door latching mechanism in both the open and closed positions. The reason for locking the door latching mechanism in its open position is to insure that it cannot be thrown inadvertently to the closed position as by the playful action of a child, although this is not a necessary precaution. The door latching mechanism is locked in the closed position to insure that the door cannot be unlocked and the door opened during the high temperature portion of the heat-cleaning cycle when the temperature is above normal cooking temperatures. This automatic locking means is represented by a spring biased, pivoted lever 44 that is pivoted at one end at the pin 46 and has a biasing spring 47 adjacent the opposite end of the lever normally pulling the lever down. The bottom edge of the lever 44 has a finger member 49 near the center thereof which is adapted to cooperate with a connecting rod 51 that extends rearwardly from the door latching mechanism 37 at the front of the oven. This connecting rod 51 is provided with a rearmost edge 53 for engagement by the finger 49 of the locking member 44 when the door latching mechanism 37 is in its closed position, and a small slot 55 closely spaced from the edge 53 for receiving the finger 49 when the door latching mechanism has been thrown to its open position causing the connecting rod 51 to move rearwardly of the oven. Thus the edge 53 and the slot 55 of the connecting rod 51 constitute detent means cooperating with the automatic locking means 44.

This automatic locking means 44 for the door latching mechanism 37 is positioned at the very back of the oven in a cooler ambient temperature principally because an electroresponsive means or solenoid 57 cooperates with the automatic locking means 44 for overriding or releasing it under certain conditions. This solenoid 57 has an armature 58 pivotally connected to the lever 44 as at 59 such that energization of the solenoid extends the armature to raise the lever and lift the finger 49 from engagement with the detents of the connecting rod 51.

The electric range of the present invention is to be furnished with an electrical service of three-wire Edison source of power; nominally of 236 volts, single phase, 60 cycle, A.C. which is usually available in a kitchen having adequate wiring. This source of power has a pair of line wires L1 and L2 with a voltage of 236 volts therebetween, and a grounded neutral conductor N with half voltage of 118 volts nominally measured across any line wire L1 or L2 and the neutral conductor N. Since the present invention relates to the control of the oven, the surface heating elements 12 and the associated wiring are not included on the circuit diagram of FIGURE 2 for the sake of simplicity. The electrical load would be the three heating elements, the bake element 16, the broil element 17 and the mullion heater 18.

The main control components are the oven selector switch 24, the oven thermostat or responder 25, a single point, temperature limiting, thermal switch 61, a door latch switch 63 and a step-down transformer 64. The door latch switch 63 is also located adjacent the rear of the connecting rod 51 so as to be actuated thereby into its alternate cooking or cleaning positions. The transformer 64 is needed to furnish low voltage power to a temperature control circuit that incorporates a variable resistance temperature sensor 66 that is adapted to be positioned within the oven cavity 13, and represents the temperature monitoring or signaling system for the oven responder 25. The responder 25 also includes an output relay (not shown) connected in the line 12 for completing the circuit to the heating elements when additional heat is called for within the oven.

The oven selector switch 24 is provided with a plurality of switch contacts that are each labeled with the particular oven operations that are involved when the contacts are closed. These switch contacts are identified as elements 70–79. For example, during a baking operation, contacts 74, 75 and 77 are closed. During a broiling operation, contacts 71 and 75 are closed. During a time-baking operation, contacts 74, 76 and 77 are closed, and finally during a heat-cleaning operation contacts 70, 72, 73, 76, 78 and 79 are closed.

The oven selector switch 24 has a first group of terminals Y, N, L1, T1, L2, and S. Terminal Y is connected by lead 133 to the solenoid 57 that serves as the release means for the locking means 44 of the door latching mechanism 37. From the solenoid 57 there is a lead 132 to a momentary contact switch 130 and leads 131 and 82 connected to line terminal L1. Terminal N is connected by lead 81 to neutral conductor N. Terminal L1 is connected by leads 82, 83 to thermal switch 61, and then by lead 84 back to line wire L1. This thermal switch 61 is a single pole, double throw switch having switch having switch contacts 122 and 123 as well as a movable contact 124. Contacts 122 and 124 are closed during normal cooking temperatures when the oven air temperature is below about 600° F., while contacts 123 and 124 are closed at oven air temperatures above about 600° F. Terminal T1 is provided with lead 86 that connects with lead 84 to line wire L1. Positioned in lead 84 between lead 86 and line wire I1 is an oven timer switch 87 which is adapted to be controlled by a clock timer (not shown) for governing both the starting and stopping time of a timed-baking operation as is conventional in this art. Terminal 12 is connected by lead 89 to the responder 25 and from the responder by lead 90 to line wire 12. In other words the before-mentioned, but not shown, output relay of the responder 25 is connected in leads 89 and 90 for making and breaking the power circuit from line L2 to the heating elements 16–18. Terminal S is joined by lead 92 to the door latch switch 63.

The oven selector switch 24 also has a second group of terminals W, J, K, M, P and X. Terminal W is connected by lead 94 to neutral conductor N. Terminal J is connected by leads 95 and 96 to the broil element 17. Terminal K is connected by lead 97 to the bake element 16. Terminal M is connected by lead 98 to one side of the primary of the transformer 64. Terminal P is connected by lead 100 to the mullion heater 18, and finally terminal X is connected by lead 101 to neutral conductor N.

The following switch contacts are related to the following pairs of switch terminals respectively: 70 and Y–W, 71 and L1–J, 72 and N–J, 73 and N–K, 74 and L1–K, 75 and L1–M, 76 and T1–M, 77 and L1–P, 78 and L2–P, and 79 and S–X.

A preferred embodiment of the present invention utilizes a bake element 16 of 3,000 watts, a broil element 17 of 3,300 watts, and a mullion heater 18 of only 825 watts when operated on 118 volts. During a baking and time-baking operation all three heating elements 16–18 are energized with the bake element at full wattage across lines L1 and L2 at 236 volts, and the broil and mullion heaters in series with each other and connected in parallel with the bake element across lines L1 and L2 at 236 volts. During the broiling operation only the broil unit 17 is energized across lines L1 and L2 at 236 volts. Finally during a heat-cleaning cycle all three heating elements are energized in parallel across line L1 and neutral conductor N at 118 volts for a total wattage of about 2,400 watts, not counting the wattage of the heater in the smoke eliminator 31 which of course would add to the total wattage consumed by the oven.

The broil unit 17 is connected to the mullion heater 18 through leads 96 and 103. The other side of the broil element 17 is connected to the bake element 16 through leads 104 and 105. The other end of lead 105 is connected to lead 89 which as mentioned previously extends from the terminal L2 of the oven selector switch 24 to the oven responder 25.

The door latch switch 63 has three sets of switch contacts 107, 108 and 109. One side of switch contacts 107 is connected by lead 92 to the terminal S of the oven selector switch 24. The other side of switch contacts 107 has a movable contact 110 which is connected by lead 112 to the primary of the transformer 64. Connected in unison with movable contact 110 is a second movable contact 113 which forms one side of the switch contacts 109. This movable contact 113 is connected by lead 114 and lead 98 to the other side of the primary of the transformer 64. One side of switch 108 is formed by the before-mentioned movable contact 110, and the other side is connected to neutral conductor N through lead 116. The other side of switch 109 is connected by lead 118 to both lead 92 as well as to a lead 120 that is connected to the switch contacts 123 of the thermal switch 61.

This thermal switch 61 is a single pole, double throw switch having switch contacts 122 and 123 as well as a movable contact 124. Lead 120, that was mentioned above, is connected to one side of switch contacts 123, while lead 83 is connected to one side of switch contacts 122, and the movable contact 124 is connected by lead 84 back to line L1. This thermal switch 61 includes an anticipator or bias heater 126 which is shunted across the mullion heater 18 by means of leads 127 and 128. Thus, whenever the mullion heater is energized as during baking, time-baking or the heat-cleaning operations the anticipator heater 126 is likewise energized. A cooling fan motor 30 is connected across line L1 and neutral conductor N between the thermal switch 61 and the door latch switch 63 by being interposed in lead 120, for circulating cooling air around the insulated oven liner as is seen in FIGURE 1. Moreover, there is a lock lamp 151 shunted across the fan motor to be energized with the fan whenever the door latch switch 62 is closed to its heat-cleaning position, thereby closing switch contacts 107 and 109.

Turning back to a consideration of the baking circuit, the bake element 16 is connected directly across lines L1 and L2 at 236 volts, and the broil element 17 and the mullion heater 18 are connected in series with each other and in parallel with the bake element across lines L1 and L2. The thermal switch 61 and the door latch switch 63 are shown in their positions during a cooking mode. The circuit may be traced from line L1 through lead 84 to the thermal switch 61, through its switch contacts 124, 122, lead 83, lead 82 to line terminal L1 of the oven selector switch 24, then to switch contacts 74 to load terminal K, lead 97, to bake element 16, lead 105, lead 89 through the oven responder 25, and then through lead 90 to line L2.

A second circuit through the selector switch is from line terminal L1 of the selector switch 24 through switch contacts 77 to load terminal P, lead 100 to mullion heater 18, leads 103 and 96 to broil element 17 and leads 104 and 105 to one side of the bake element 16. This circuit connects the broil element 17 and the mullion heater 18 in series with each other and in paralell across the bake element 16.

A third circuit through the oven selector switch 24 energizes the primary of the transformer 64 by means of switch contacts 75 to load terminal M, lead 98 to one side of the primary and then by lead 112 to the movable contact 110 of the door latch switch 63, through switch contacts 108 to the neutral conductor N by way of lead 116. By energizing the transformer, a low voltage supply is provided for the temperature control circuit of the responder 25.

The broiling circuit has the broil element 17 as the only heating element that is energized, and it is connected across lines L1 and L2 at 236 volts. The circuit is from line L1, lead 84 to the thermal switch 61 through switch contacts 122, and then by leads 83 and 82 to line material L1 of the oven selector switch 24, then through switch contacts 71 to load terminal J, leads 95 and 96 to broil element 17 and then back to line L2 through leads 104, 105, 89 and through oven responder 25 and lead 90. The transformer 64 is energized during the broiling operation in the same manner as during the baking operation. Notice that during the broiling operation neither the mullion heater 18 nor the anticipator heater 126 of the thermal switch 61 is energized, thus the thermal switch 61 is not meant to function during the broiling operation, but simply during the baking, time-baking and the heat-cleaning modes.

Now we come to an explanation of the operation of the heat-cleaning mode. The circuit may be traced first with the solenoid 57 connected across line L1 and neutral conductor N with the solenoid connected in series with a momentary contact switch 130 as well as the thermal switch 61 and particularly its normally closed, switch contacts 122, 124 and then by lead 84 to the line L1. The other side of the solenoid 57 is connected through lead 133 to line terminal Y through switch contacts 70 to terminal W, lead 94 to neutral conductor N. The energization of the solenoid 57 by closing the momentary switch 130 raises the automatic locking means 44 for the door latching mechanism by disengaging the finger 49 from the back edge 53 of the connecting rod 51 allowing or freeing the door latch handle 38 so that it may be operated. When the momentary contact switch 130 is released, the solenoid 57 is deenergized and the biasing spring 47 will cause the finger 49 to enter the slot 55 of the connecting rod 51 thereby locking the door latching mechanism in its closed position. The closing of the door latching mechanism 37 will cause the door latch switch 63 to be operated from its cooking to its cleaning position thereby closing switch contacts 107, 110 through leads 112 and 92, as well as switch contacts 109, 113 through leads 114 and 118.

As mentioned previously all three heating elements 16–18 are energized in parallel across line L2 and neutral conductor N at 118 volts, while the solenoid 57 and the thermal switch 61 are connected across the other lead wire L1 and the neutral conductor N. Notice that the thermal switch 61 is no longer connected by the selector switch 24 in the power circuit to the heating elements 16–18. Instead the thermal switch is connected in the solenoid circuit. The power circuit may be traced as follows from neutral terminal N through switch contacts 71 to load terminal J, through the broil and mullion heaters 17 and 18 respectively by means of leads 95, 96 and 103 and back to lead wire L2 through leads 105, 89, oven responder 25 and lead 90, as well as from the mullion heater 18 through lead 100 to load terminal P, through switch contacts 78 to line terminal L2 and then back to line 12. The circuit through the bake element 16 is from neutral terminal N through switch contacts 73 to load terminal K, lead 97 to bake element 16 and then by lead 105 back to line L2.

The transformer is energized from line L1 through line terminal T1 through switch contacts 76 through load terminal M, lead 98 to the primary of the transformer 64 and then by lead 112 through switch contacts 107, 110 of the door latch switch 63, then by lead 92 to terminal S of the oven selector switch 24 and then through switch contacts 79 to load terminal X to neutral conductor N by way of lead 101.

When the oven air temperature reaches about 600° F. the thermal switch 61 is calibrated to trip and open the circuit through switch contacts 122 and close a circuit through switch contacts 123 thereby de-energizing the solenoid circuit through leads 83, 131, 132, 133 and completing the circuit for the fan motor 30 across line L1 and neutral conductor N.

The preferred embodiment of the present invention utilizes a bi-metallic disc type of thermal switch 61 which is not located directly within the oven cavity 13, but instead is located outside of the insulated oven liner and particularly on one of the unheated or cold terminal ends 135 of the oven bake element 16 at the back of the range as is best seen is FIGURE 1. A standard metal sheathed, electrical resistance, heating element such as the bake element 16 comprises a resistance wire wound in a helix for substantially the entire length of the sheath except that this helix is straightened out adjacent the terminal ends of the element, and this straightened-out portion is known as the unheated or cold terminal end. This unheated section of the bake element begins within the oven cavity and would extend out through an opening 140 in the oven liner and through the oven insulation 29 to the very end of the heater wire where a large terminal pin or tab would be fastened thereto. Thus, the thermal switch 61 operates in relatively low ambient temperatures as compared with the oven air temperature, but still it is a reliable indicator of the oven air temperature; in other words, it is an accurate analog of the temperature conditions within the oven cavity.

The actual physical construction of the thermal switch 61 is shown schematically in the enlarged view of FIGURE 4 where there is a circular bi-metal disc 136 which is supported in a canister 137 that overlies the sheath of an unheated or cold terminal end of the bake element 16. The canister is held in place by a metal clamp 138 which encircles the bottom portion of the terminal end and engages the canister 137 with a pinching action as at 139. The thermal switch mechanism is mounted in a hollow housing 143 of molded electrical insulated material such as phenolic or the like to complete the assembly. The anticipator heater 126 is shown closely spaced from the disc 136 and it has leads 127 and 128. The movable contact 124 of the thermal switch is a cantilever spring blade whose position is controlled by pressure from an electrically insulated plunger 141 that bears at its opposite end against the center portion of the disc 136. Thus flexure of the disc 136 due to increases in its temperature will eventually cause the plunger 141 to shift the movable contact 124 into engagement with contact 123 and thereby causing the alternate opening or closing of the circuit through the switch contacts 122 and 123.

To recapitulate, the thermal switch 61 has dual functions; namely, to open the power circuits to the oven heating elements during the baking mode in the event the oven air temperature exceeds the safe temperature level on ordinary cooking operations if a control component failure were to occur. The second function is to open the circuit to the solenoid 57 when the oven air temparature rises above the normal maximum cooking temperature into the heat-cleaning temperature range above about 750° F. The thermal switch 61 prevents the unlocking and opening of the oven door during the high temperature portion of a heat-cleaning operation while allowing power to continue to flow to the oven heating elements so that the oven temperature may reach the predetermined maximum temperature, while at the same time not permitting the oven temperature to rise above about 600° F. during normal baking operations.

The thermal switch 61 receives two heating signals as is shown in the temperature-time graph of FIGURE 3. Some of the heat experienced by the thermal switch 61 is derived from the heat of conduction through the metal sheath of the bake element 16, and tis is shown as curve 180 and marked "Bake Unit Signal." The second heating signal for the thermal switch 61 is derived from the anticipator heater 126 and it is shown as curve 181 in FIGURE 3 and marked "Heater Signal." The temperature signal (curve 180) from the bake element 16 and the temperature signal (curve 181) from the anticipator heater 126 will be accumulative. An oven air temperature curve for a normal baking operation is shown as curve 182 up to a point 183 at a preset temperature for example of 390° F. at which point in time the oven heating elements are de-energized and cycle On and Off thereby forming the sawtooth, curve 184 which is shown in dotted lines. This temperature curve 182, 183 and 184 is labeled "Normal Bake."

In the event of a failure in the oven responder 25, such as the welding of the contacts, the maximum temperature in the oven during the baking operation would not stop at point 183, but would continue to rise following the curve 185. The bi-metal disc 136 of the thermal switch 61 is, in its preferred embodiment, set to trip at about 210° F. which in the graph of FIGURE 3 would occur within 20 minutes after the baking cycle has been initiated from a room temperature condition of about 70° F., as is shown by the vertical dash line 186. Thus when this thermal switch 61 opens the circuit through switch contacts 122, te oven heating elements 16–18 are de-energized and they will begin to cycle On and Off starting at an oven air temperature of about 600° F. at point 187 and forming a sawtooth configuration labeled "Runway Bake."

Modifications of this invention will occur to those skilled in this art, therefore it is to be understood that this invention is not limited to the particular embodiments disclosed but that it is intended to cover all modifications which are within the true spirit and scope of this invention as claimed.

What we claim as new and desire to secure by Letters Patent of the United States is:

1. A high temperature cooking oven comprising a cabinet structure enclosing a box-like oven liner that has an open front provided with an access door that cooperates with the oven liner to define an oven cooking cavity, heating means for supplying heat energy into the oven cavity, oven switching means having a variable cooking position for controlling the heating means for normal 550° F. as well as a heat cleaning position for a heat cleaning operation above about 750° F. for removing food soil lodged on the walls of the oven liner, and door latching means movable between open and closed positions for holding the door closed during the heat-cleaning operation, and locking means for locking the door latching means when the door latching means is in the closed position, and electroresponsive means for releasing the said locking means, a normally closed temperature limiting thermal switch associated with the oven cavity as a redundant temperature control means and connected by the oven switching means in its variable cooking position to be in series with the oven heating means during the cooking operation, said thermal switch being open-circuited at oven temperatures of about 600° F. and above to limit the maximum oven temperature in the event of a component failure, said oven switching means in its heat cleaning position disconnecting the thermal switch from the oven heating means and connecting it in series with the electroresponsive means, said thermal switch being open-circuited at oven temperatures of about 600° F. for disabling the electroresponsive means and thereby preventing the access door from being opened while the oven temperature is above about 600° F.

2. A high temperature oven as recited in claim 1 wherein the oven heating means comprises several metal sheathed electrical resistance heating elements located within the oven cavity, said heating elements having unheated terminal ends which extend out of the oven cavity for making electrical connection therewith, said thermal switch being mounted upon the sheath at the terminal ends of one heating element outside of the oven cavity so as to derive heat from the sheath and operate at a temperature which is a predictable function of the oven air temperature.

3. A high temperature cooking oven comprising a cabinet structure enclosing walls forming a box-like oven liner that has an open front provided with an access door that cooperates with the oven liner to define an oven cooking cavity, oven heating means in the form of a lower baking element and an upper broiling element, said elements being of the electrical resistance heating type and having terminal ends which extend out through the walls of the oven cavity, oven selector switch means for arranging the connection of the heating elements to a source of electrical power, oven temperature control means for governing the energization of the heating elements so as to maintain preselected oven temperatures, oven door latching means movable between open and closed positions for holding the door closed during the high temperature portion of the oven heating cycle above about 600° F., and locking means for locking the door latching means when the door latching means is in the closed position, and electroresponsive means for releasing the said locking means, a temperature limiting thermal switch circuit connected with the oven heating elements as a redundant temperature control means in the low temperature cooking portion of the oven heating cycle and calibrated to break the heating circuit at oven temperatures of about 600° F. and above in the event of a component failure, said oven selector switch means in a high temperature position serving to disconnect the thermal switch from the heating circuit and connecting the thermal switch in circuit with the electroresponsive means, said thermal switch becoming open-circuited at an oven temperature of about 600° F. so that the electroresponsive means may be operated at oven temperatures below about 600° F. and may not be operated at oven temperatures about about 600° F.

4. A cooking apparatus comprising walls forming an oven cavity, one wall of the apparatus including a door for gaining access thereto, electrical heating element for heating the oven cavity, oven temperature control means including an oven selector switch means for arranging the heating elements in different circuits for obtaining variable rates of heating, and an adjustable oven temperature control means for holding various preselected oven temperatures in the range below about 550° F. for normal cooking operations and above about 750° F. for normal pyrolytic cleaning of the food soil lodged on the walls of the oven cavity, and an oven door latching means for holding the door closed when the oven temperature is above the normal cooking temperature, locking means for locking the door latching means, and electroresponsive release means operating with the locking means so that the door latching means may be operated, a fixed point temperature limiting thermal switch located outside the oven cavity, said thermal switch being arranged in a circuit with the electrical heating elements by the oven selector switch for the normal cooking operations as a redundant temperature control means, while said thermal switch is arranged in a circuit with the said electroresponsive means for a pyrolytic oven operation whereby the thermal switch serves as an over-temperature protective means in the event of a component failure during the cooking operation and alternately serves as a lockout means during the pyrolytic operation.

5. A cooking apparatus as recited in claim 4 wherein the said thermal switch is mounted directly on the terminal end of one of the heating elements so that the temperature of the thermal switch tracks the oven temperature as a predictable function thereof.

6. A cooking apparatus as recited in claim 5 wherein the thermal switch includes an anticipator heater combined therewith, and circuit means for connecting the anticipator heater in circuit with at least one of the heating elements during both the baking operation as well as during the pyrolytic operation so as to provide heat signal to the thermal switch in addition to the heat signal from the heating element upon which the thermal switch is mounted.

7. A self-cleaning oven having a box-like oven liner and a front-opening access door for forming an oven cooking cavity, a layer of insulation surrounding the oven liner, metal sheathed resistance heating means for supplying heat to the oven cavity, said heating means including a lower baking element and an upper broiling element, oven control means including an oven selector switch means and an oven thermostat, circuit means joining the resistance heating means through the selector switch means and adapted to connect the selector switch means to a source of alternating current, said selector switch means having various cooking modes and a heat-cleaning mode, said oven thermostat including switch means in the power circuit of the heating means to hold various pre-selected temperatures, and door latching means for holding the oven door closed during the heat-cleaning mode, locking means for locking the door latching means, and electroresponsive means combined with the said locking means for overcoming the locking means so that the door latching means may be operated, a fixed point temperature limiting thermal switch having a switching mechanism positioned outside the insulated layer of the oven liner to sense a temperature which is a predicable function of the oven air temperature, said thermal switch being joined in a circuit with the oven selector switch means so that when the selector switch is in one of the cooking modes the thermal switch is in series with the resistance means as a redunant temperature control means, while when the oven selector switch means is in the heat-cleaning mode the thermal switch is connected in series with the said electroresponsive means, whereby the thermal switch opens the respective circuits when the oven air temperature reaches a predetermined critical temperature of about 600° F.

8. A self-cleaning oven as recited in claim 7 wherein the resistance heating means are adapted to be connected to a three wire source of alternating current, the oven selector switch in the various cooking modes adapted to connect the resistance heating means across two line wires at a nominal voltage of 236 volts, while in the heat cleaning mode the oven selector switch is adapted to connect the said heating means across one line wire and a neutral wire at a nominal voltage of 118 volts, and the oven selector switch is adapted to connect the electro-responsive means in series with the thermal switch across the other line wire and the neutral wire.

9. A self-cleaning oven as recited in claim 8 wherein the resistance heating means includes a lower baking element, an upper broiling element, and a front mullion heater adjacent the oven door, said thermal switch being mounted directly to the sheath of the lower baking element adjacent the unheated terminal end thereof which lies outside the insulating layer of the oven liner, and a biasing heater combined with the thermal switch mechanism, and circuit means for connetcing the biasing heater in parallel with the mullion heater to provide an additional heat signal during both the baking and the heat-cleaning modes.

References Cited

UNITED STATES PATENTS

| 3,358,122 | 12/1967 | Torrey | 219—413 |
| 3,327,094 | 6/1967 | Martin et al. | 219—393 |

BERNARD A. GILHEANY, Primary Examiner

H. B. GILSON, Assistant Examiner

U.S. Cl. X.R.

219—393

UNITED STATES PATENT OFFICE
CERTIFICATE OF CORRECTION

Patent No. 3,484,858          Dated December 16, 1969

Inventor(s) Samuel C. Jordan and Teamus Bowling

It is certified that error appears in the above-identified patent and that said Letters Patent are hereby corrected as shown below:

Column 9, line 66, after "normal" insert -- cooking operation between about 150° F. and about --

Column 12, line 5, after "resistance" insert -- heating --;
line 6, cancel "redunant" and insert -- redundant --;
line 33, cancel "connetcing" and insert -- connecting --

SIGNED AND
SEALED
JUN 9 1970

(SEAL)
Attest:

Edward M. Fletcher, Jr.
Attesting Officer

WILLIAM E. SCHUYLER, JR.
Commissioner of Patents